US008350173B2

(12) United States Patent
Kiani et al.

(10) Patent No.: US 8,350,173 B2
(45) Date of Patent: Jan. 8, 2013

(54) DETERMINING DISPOSITION OF UNDELIVERABLE AS ADDRESSED MAIL

(75) Inventors: Shahrom Kiani, Arlington, TX (US); Ben F. Bruce, Arlington, TX (US); Carlos Macia, Plano, TX (US)

(73) Assignee: Trinity Technical Group, Inc., Arlington, TX (US)

( * ) Notice: Subject to any disclaimer, the term of this patent is extended or adjusted under 35 U.S.C. 154(b) by 687 days.

(21) Appl. No.: 12/181,884

(22) Filed: Jul. 29, 2008

(65) Prior Publication Data

US 2009/0143898 A1 Jun. 4, 2009

Related U.S. Application Data

(60) Provisional application No. 61/005,225, filed on Dec. 4, 2007, provisional application No. 61/069,537, filed on Mar. 17, 2008.

(51) Int. Cl.
*G06K 9/00* (2006.01)

(52) U.S. Cl. ........ 209/584; 209/583; 209/900; 700/213; 700/219

(58) Field of Classification Search .................. 209/583, 209/584, 900; 382/101; 700/219, 224, 226; 705/402

See application file for complete search history.

(56) References Cited

U.S. PATENT DOCUMENTS 5,363,971 A 11/1994 Weeks et al.
5,422,821 A * 6/1995 Allen et al. .................. 700/219
5,703,783 A 12/1997 Allen et al.
6,508,365 B1 * 1/2003 Cacace-Bailey et al. ..... 209/584
6,826,548 B2 * 11/2004 Hungerpiller et al. ........ 705/401
7,124,948 B2 * 10/2006 Longacre et al. ........ 235/462.01
7,834,289 B2 * 11/2010 Orbke et al. .................. 209/584
2002/0087861 A1 * 7/2002 Segev et al. .................. 713/168
2003/0191651 A1 * 10/2003 Hungerpiller et al. ............ 705/1
2005/0199717 A1 * 9/2005 Park et al. ..................... 235/385
2006/0080266 A1 * 4/2006 Kiani et al. .................. 705/402
2008/0269946 A1 10/2008 Kiani et al.

OTHER PUBLICATIONS

Kiani, Shahrom, et al., "Processing of Undeliverable as Addressed Mail", U.S. Appl. No. 12/108,681, filed Apr. 24, 2008, 33 pgs.
*Trinity Technical Group Inc.* v. *Siemens Industry Inc.* filed in the U.S. District Court, Northern District of TX, Dallas Division (Nov. 14, 2012) Case 3:12-cv-04602 (Patent Nos. 8,806,346 and 8,311,667).

* cited by examiner

*Primary Examiner* — Terrell Matthews
(74) *Attorney, Agent, or Firm* — DeLizio Gilliam, PLLC

(57) ABSTRACT

In some example, a computerized method includes sorting mail, wherein sorting mail for a mail piece comprises reading an encoded value located on the mail piece. Sorting the mail also includes decoding the encoded value to determine an identification of a class of the mail piece and an identification of a service type of the mail piece. Sorting the mail includes performing the following operation in response to determining that the mail piece is undeliverable as addressed: performing final disposition of the mail piece using at least one of the identification of the class of the mail piece or the identification of the service type of the mail piece derived from the encoded value, in response to a determination that the mail piece is an actual undeliverable as addressed mail piece.

17 Claims, 4 Drawing Sheets

DETERMINING DISPOSITION OF UNDELIVERABLE AS ADDRESSED MAIL

RELATED APPLICATION(S)

This patent application claims the benefit of priority, under 35 U.S.C. Section 119(e), to U.S. Provisional Patent Application Ser. No. 61/005,225, filed on Dec. 4, 2007 and to U.S. Provisional Patent Application Ser. No. 61/069,537, filed on Mar. 17, 2008, which are both incorporated herein by reference.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright© 2008, Trinity Technical Group, Incorporated. All Rights Reserved.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The delivery of mail includes identification and processing of mail that is undeliverable as addressed (UAA). The processing of UAA may include returning to the sender, forwarding to a different address, treating as waste, etc.

The delivery of mail includes identification and processing of mail that is undeliverable as addressed (UAA). The processing of UAA may include returning to the sender, forwarding to a different address, treating as waste, etc.

BRIEF DESCRIPTION OF THE DRAWINGS

The embodiments are provided by way of example and not limitation in the figures of the accompanying drawings, in which like references indicate similar elements and in which.

DETAILED DESCRIPTION

Figure 1:
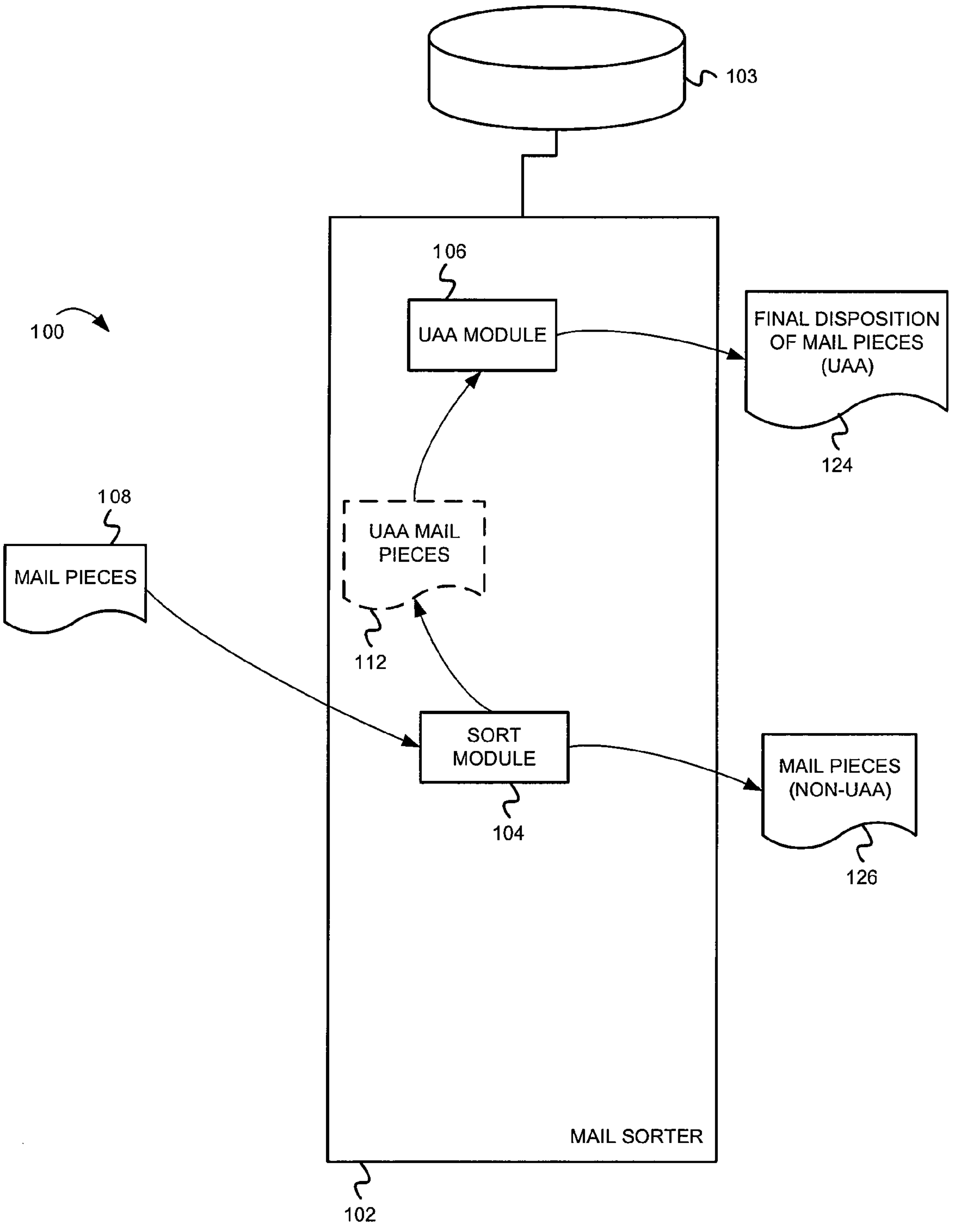
FIG. 1 is a system diagram for processing undeliverable as addressed (UAA) mail pieces, according to some example embodiments.

Methods, apparatus and systems for processing undeliverable as addressed mail are described. In the following description, numerous specific details are set forth. However, it is understood that embodiments of the invention may be practiced without these specific details. In other instances, structures and techniques have not been shown in detail in order not to obscure the understanding of this description.

Some example embodiments use encoded values that are located on mail pieces for processing those mail pieces that are undeliverable as address (UAA). In some example embodiments, the encoded values are bar codes that are placed on the mail pieces by mailers of the mail pieces. These bar codes have generally been used by the mail delivery service providers, such as the United States Postal Service (USPS), for delivery of the mail. An example of such a bar code is the Intelligent Mail® Barcode (IMB). Conventionally, the IMB is a bar code on a mail piece that is used to sort and track mail pieces. Currently, the USPS provides automation discounts for mailers that place IMBs on their mail pieces. Some example embodiments use the IMB for different operations of UAA processing (as described below). Example embodiments herein are described as using an IMB. However, embodiments are not limited to the format for the IMB. Example embodiments may be used on any type of encoded value in any of a number of different formats with different types of encoded data therein.

The encoded value may include different types of information to assist in sorting and tracking of the mail. For example, the encoded value may include different types of mail parameters for a mail piece, such as routing data (e.g., the delivery point), the mail class, the service type, the mailer identification number, identification of recipient, address of mailer, etc.

In some example embodiments, the delivery point (decoded from the encoded value) may be used to determine whether a mail piece is a candidate UAA mail piece. In some example embodiments, the data decoded from the encoded value is also used to confirm that a candidate UAA mail piece is an actual UAA mail piece. In some example embodiments, the data decoded from the encoded value is also used to determine final disposition of the confirmed actual UAA mail piece. In some example embodiments, the data decoded from the encoded value is also used to determine a return address of a send of the mail piece (which may be used if the mail is an actual UAA mail piece). These example embodiments may be used in any combination. For example, in some example embodiments, the data from the encoded value is used to determine whether the mail piece is a candidate UAA mail piece; used to confirm that a candidate UAA mail piece is an actual UAA mail piece; used to determine final disposition of the actual UAA mail piece; and used to determine a return address. In other examples, the data from the encoded value may be used to perform only one operation or less than all of the operations of UAA processing (listed described above). For example, data from the encoded value may only be used to confirm that a candidate UAA mail piece is an actual UAA mail piece. In another example, the data from the encoded value may only be used to determine final disposition of the actual UAA mail piece. Accordingly, if the encoded value is used for less than all of the operations for UAA processing, other data or other techniques may be used to perform these other operations.

In some example embodiments, the encoded value (and/or the data decoded there from) may be correlated with the name of the recipient of the mail piece. For example, the encoded value, the data decoded there from and the name of the recipient for a mail piece may be stored in a data structure within a database. This database may be stored in a machine-readable medium that is local or remote to the mail processing facility. In some example embodiments, parts of this data may be populated by the mailers of the mail pieces, while others parts of this data may be populated by operations performed by the mail processing equipment. For example, mailers of the mail pieces may store the encoded value and the name of the recipient for a mail piece, while the operations of the mail processing equipment may cause storage of the data decoded from the encoded value. This data is then accessible by mail processing equipment during UAA processing. For example, the encoded value may be used as a key for looking up the name of the recipient in the machine-readable medium. The name of the recipient can then be used to determine whether a candidate UAA mail piece is confirmed to an actual UAA mail piece.

Such embodiments are in contrast to conventional techniques for UAA processing of mail pieces. In particular, using conventional techniques, mail sorters can only detect if a mail piece is UAA. However, some mail sorters cannot determine final UAA disposition (Forward, Return to Sender, Treat as Waste, etc.) for mail pieces. In particular, in order to determine final disposition other characteristics such as the mail class and service type need to be taken into account. Using conventional techniques, these additional characteristics can only be obtained by capturing and analyzing the image of a UAA mail piece using pattern recognition, Optical Character Recognition (OCR) methodologies or video coding techniques. As a result, the UAA mail pieces are re-processed on other OCR capable mail processing equipment to capture and analyze the mail class, service type and return address. Subsequently, the final disposition of a UAA mail piece may be determined. This required additional processing results in a significant cost to mail processing. A more detailed description of the systems, apparatus and methods for processing undeliverable as addressed mail are now described.

FIG. 1 is a system diagram for processing undeliverable as addressed (UAA) mail pieces, according to some example embodiments. FIG. 1 illustrates a system 100 that includes a mail sorter 102 and a machine-readable medium 103. The mail sorter 102 may be a letter mail sorter, a flat mail sorter, a mixed mail sorter, a parcel mail sorter, or any other type of device that sorts mail pieces.

Mail sorter 102 comprises a sort module 104 and a UAA module 106. The sort module 104 and the UAA module 106 may be software, hardware, firmware or a combination thereof. While the UAA module 106 is shown as being part of the mail sorter 102, embodiments are not so limited. In some example embodiments, the UAA module 106 may be separate from the mail sorter 102. Alternatively or in addition, the functionality of the UAA module 106 may be incorporated into the sort module 104.

The sort module 104 receives and sorts the mail pieces. In some example embodiments, the sort module 104 sorts the mail pieces based on an encoded value (such as an IMB), a delivery point bar code or a combination thereof. The encoded value may be pre-printed onto the mail pieces by the mailer. As further described below, in some example embodiments, the encoded value is used to perform some or all of the operations of UAA processing.

As shown, the mail pieces 108 are passed to the sort module 106 during a mail sort operation. The sort module 104 may decode an encoded value located on a mail piece. The sort module and the UAA module 106 may perform some or all of the operations of UAA processing using the decoded data from the encoded value. For example, the sort module 104 may identify mail pieces as candidate UAA mail pieces by comparing a delivery point (encoded in the encoded value) to a table, list, etc. of addresses of recipients of mail whose address has changed (hereinafter referred to as a change of address table). In particular, based on the delivery point, the sort module 104 may be able to identify that one or more persons have changed addresses for this particular location. Multiple persons/entities may be having mail delivered to this particular location. Accordingly, one person for a given location may have changed addresses, while other persons for this location have not changed addresses. Therefore, until the recipient is identified, the mail piece is only a candidate UAA mail piece.

If the sort module 104 identifies the mail piece as a candidate UAA mail piece, the sort module 104 may pass the mail piece to the UAA module 106 for further processing (UAA mail pieces 112). The sort module 104 outputs the mail pieces (non-UAA)—126. For a candidate UAA mail piece, the UAA module 106 determines whether the UAA mail piece is confirmed to be an actual UAA mail piece. In some example embodiments, the UAA module 106 uses data decoded from the encoded value to perform this confirmation. Moreover, for those actual UAA mail pieces, the UAA module 106 determines a final disposition (final disposition of mail pieces (UAA)—124). In some example embodiments, the UAA module 106 uses data decoded from the encoded value to determine this final disposition.

The machine-readable medium 103 may be volatile and/or non-volatile media (e.g., read only memory (ROM), random access memory (RAM), magnetic disk storage media, optical storage media, flash memory devices, etc.). The machine-readable medium 103 may be local or remote relative to the mail sorter 102. For example, in some embodiments, the machine-readable medium 103 may be representative of machine-readable media distributed at different locations under the control of the mailers of the mail pieces. Accordingly, the mailers may have their own machine-readable medium that is accessible remotely by the mail sorter. Alternatively or in addition, the machine-readable medium 103 may be located at the mail processing facility (which is local to the mail sorter 102). In some example embodiments, the machine-readable medium 103 stores data related to, extracted from, etc. the encoded values. For example, for a given encoded value, an entry in the machine-readable medium 103 may include the encoded value, the name of the recipient of the mail piece, customer identification number for the mailer and the mail class, service type and return address for the mail piece. In some example embodiments, parts of this data (e.g., the encoded value and the name of the recipient) is populated by the mailer of the mail pieces. For example, the populating of this data may be a requirement for qualification of the IMB automation discounts for mailers. Some mailers may desire to keep the names of the recipients of the mail pieces confidential. In some example embodiments, the names of the recipients may be stored in a separate machine-readable medium (e.g., a machine-readable medium under the control of the mailer). Alternatively or in addition, the names of the recipients may be encrypted.

Figure 2:
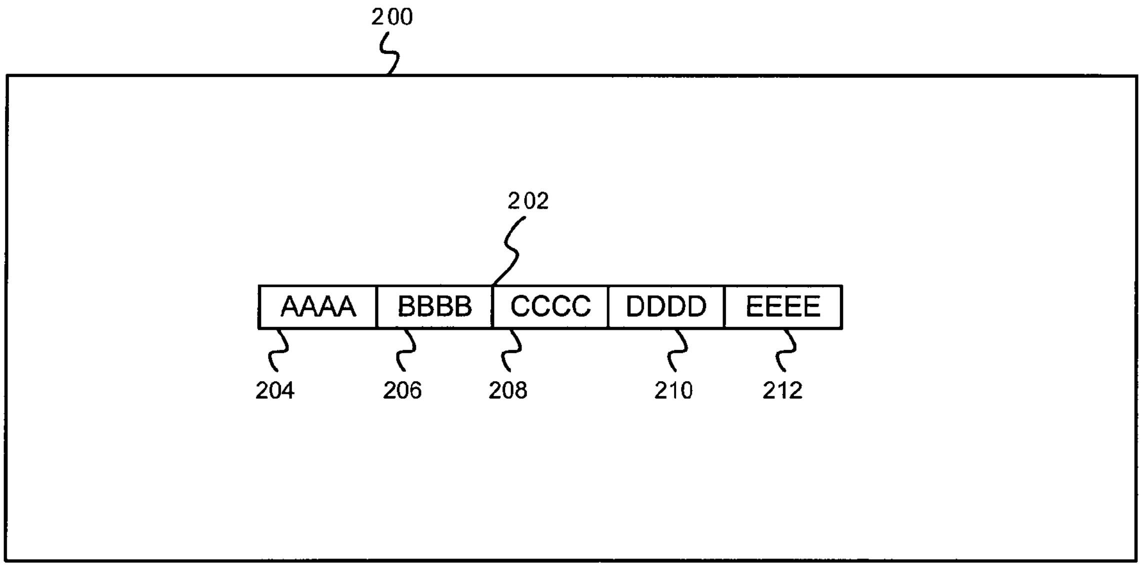
FIG. 2 is a diagram of a mail piece that includes an encoded value, according to some example embodiments.

FIG. 2 is a diagram of a mail piece that includes an encoded value, according to some example embodiments. FIG. 2 illustrates a mail piece 200 that includes an encoded value 202. The encoded value 202 includes different data encoded therein. In this example, the encoded value 202 includes a delivery point 204, a mailer identification 206, a recipient identification 208, a mail class 210 and a mail service type 212. In some other example embodiments, the encoded value 202 may include more or less data.

Figure 3:
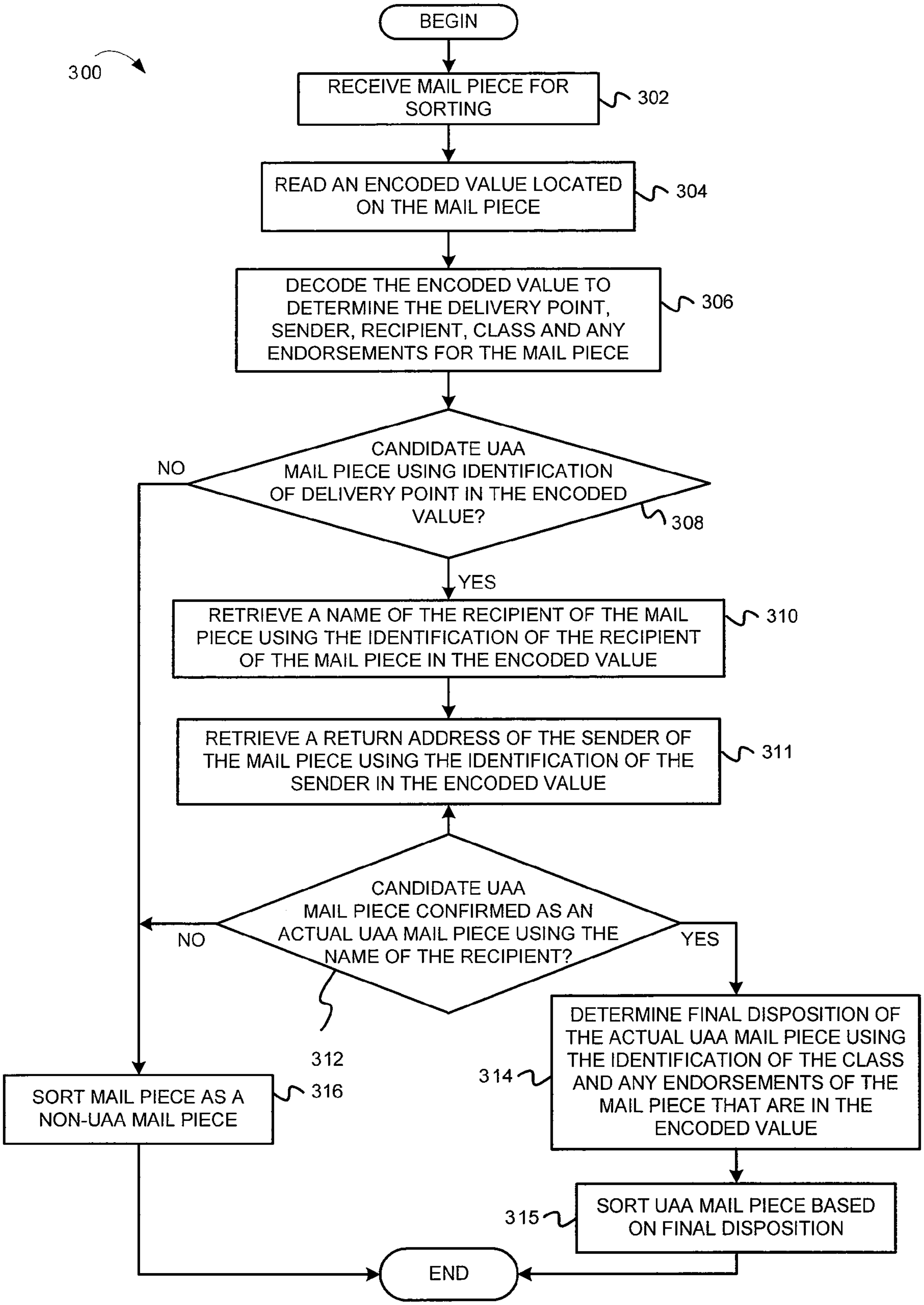
FIG. 3 is a diagram of a method for performing includes processing of a mail piece that includes UAA processing, according to some example embodiments.

Operations, according to example embodiments, are now described. In certain embodiments, the operations are performed by instructions residing on machine-readable media (e.g., software), while in other embodiments, the methods are performed by hardware or other logic (e.g., digital logic). FIG. 3 is a diagram of a method for performing includes processing of a mail piece that includes UAA processing, according to some example embodiments. A method 300 is described with reference to FIGS. 1-2. In some example embodiments, the method 300 is performed by at least one of the sort module 104 and the UAA module 106. The method 300 commences at block 302.

At block 302, the sort module 104 receives a mail piece for sorting. The mail pieces may comprise both UAA and non-UAA mail pieces. In some example embodiments, the mailer of the mail pieces print, mark, attach, etc. an encoded value onto an outside part of the mail pieces, as shown in FIG. 2. The method 300 continues at block 304.

At block 304, the sort module 104 reads the encoded value located on the mail piece. The encoded value may be a bar code, an alphanumeric value, etc. For example, in some embodiments, the encoded value is an IMB that is a type of height-modulated bar code. For example, the encoded value may be a vertical bar type that uses one to N number of different types of vertical bars. Therefore, in some examples, the sort module 104 may use some type of bar code scan operation to read the encoded value. The method continues at block 306.

At block 306, the sort module 104 decodes the encoded value to determine some or all of the following data: (1) the delivery point for the mail piece; (2) an identification and return address of the sender of the mail piece; (3) the class of the mail piece and (4) any endorsements (service types) for the mail piece. Other types of data (e.g., mailing sequence number) may also be decoded from the encoded value.

In some example embodiments, the sort module 104 may update the data entry in the machine-readable medium 103 for this given encoded value. As described above, in some example embodiments, the mailers of the mail pieces may input data into the machine-readable medium 103 for access by the sorting module 104 or the UAA module 106. For example, the mailers may create an entry, table, array or any other type of data structure for a given encoded value. Within that entry in the machine-readable medium 103, the mailers may include the name of the recipient of the mail piece for the given encoded value. In some example embodiments, this input of data by the mailers may be performed prior to the mail pieces being sorted by the mail sorter 102. In some example embodiments, the mailers may perform updates to the machine-readable medium 103 on a periodic basis or as mailer submit new mail pieces for sorting.

In conjunction with decoding the encoded value, the sort module 104 may add the decoded data into the associated data structure for the encoded value. In particular, the sort module 104 may store some or all of the parts of the decoded data for this encoded value. Moreover, in some example embodiments, the decoded data is provided to the mailers of the mail pieces. For example, the mailers may have subsequent access to the machine-readable medium 103 to access their encoded values. Alternatively or in addition, this decoded data may be transmitted electronically or provided in a hard copy format to the mailers. Accordingly, the sort module 104 may perform the updates to the machine-readable medium 103 and transmitted the decoded data to the associated mailers, as part of the decoding operation. The sort module 104 may perform the updates and/or the data transmission in real time or non-real time relative to the decoding operation. For example, the sort module 104 may perform the updates to the machine-readable medium 103 in real time. Subsequently, the sort module 104 may transmit the decoded data to the mailers in non-real time. The method 300 continues at block 308.

At block 308, the sort module 104 determines whether the mail piece is a candidate mail piece using the identification of the delivery point decoded from the encoded value. The sort module 104 may compare the delivery point bar code to a table, list, etc. of addresses of recipients of mail whose address has changed. Such data may be stored in the machine-readable medium 103 or some other of machine-readable media. If the delivery point bar code for a mail piece is within this list of addresses, the sort module 104 identifies the mail piece as a candidate UAA mail piece. As described below, further confirmation and final disposition of a candidate UAA mail piece is performed in subsequent operations. While described such that the sort module 104 obtains the delivery point from the encoded value, embodiments are not so limited. In some example embodiments, the delivery point may be obtained from a delivery point bar code that is also located on the mail piece. If the mail piece is not a candidate UAA mail piece, the method 300 continues at block 316 (which is described in more detail below). Otherwise, the method 300 continues at block 310.

At block 310, the UAA module 106 retrieves the name of the recipient of the mail piece using the identification of the recipient of the mail piece in the encoded value. The UAA module 106 may retrieve the name of the recipient of the mail piece from the machine-readable medium 103. In particular, as described above, in some example embodiments, the mailer of the mail piece stored the name of the recipient into the machine-readable medium 103. Accordingly, the UAA module 106 may retrieve the recipient name from the machine-readable medium 103. In some example embodiments, the UAA module 106 may perform the lookup based on the identification of the recipient (that was part of the decoded data from the encoded value), the encoded value, etc. The method 300 continues at block 312.

At block 311, the UAA module 106 retrieves the return address of the sender of the mail piece using the identification of the sender of the mail piece in the encoded value. The UAA module 106 may retrieve the return address of the sender of the mail piece from the machine-readable medium 103. In particular, in some example embodiments, the mailer of the mail piece stored its return address into the machine-readable medium 103. Accordingly, the UAA module 106 may retrieve the return address from the machine-readable medium 103. In some example embodiments, the UAA module 106 may perform the lookup based on the identification of the sender (that was part of the decoded data from the encoded value), the encoded value, etc. In some example embodiments, the return address may be used if the mail piece is returned to the sender as part of the final disposition of the actual UAA mail piece. Embodiments are not limited to obtaining the return address of the sender as described in the operation at block 311. Alternatively or in addition, in some example embodiments, the return address of the sender may be obtained by other techniques, such as OCR. The method 300 continues at block 312.

At block 312, the UAA module 106 determines whether the candidate UAA mail piece is confirmed to be an actual UAA mail piece using the name of the recipient. In some example embodiments, the UAA module determines if the recipient's name for this mail piece is in an entry in the change of address table for this delivery point. As described above, multiple recipients of mail pieces may be associated with a given delivery point. If the recipient's name on the mail piece is in the change of address table, the mail piece is considered to be a UAA mail piece. Otherwise, the mail piece is processed as a non-UAA mail piece. If the mail piece is not confirmed to be a UAA mail piece, the method continues at block 316, which is described in more detail below. Otherwise, the method continues at block 314.

At block 314, the UAA module 106 determines final disposition of the actual UAA mail piece using the identification of the class and any endorsements of the mail piece that are in the encoded value. Because the UAA mail piece is confirmed as an actual UAA mail piece, final disposition may occur. In some example embodiments, final disposition may include return the mail piece to the sender, forwarding to a new address or treating as waste. Final disposition may depend on the class of mail, the length of time since the address has changed, mailer applied endorsements, etc. For example, if the mail piece is first class mail and the length of time is less than N number of months, the mail piece is labeled for forwarding to the new address. In another example, if the mail piece is standard A class mail and the length of time is greater X number of days and there are no services requested (endorsements), the mail piece is treated as waste. The method 300 continues at block 315.

At block 315, the UAA module 106 sorts the mail piece based on the final disposition. The UAA module 106 can sort the mail piece in accordance with the type of final disposition. For example, the UAA mail piece may sorted into three different groups depending on the type of final disposition: return the mail piece to the sender; forward to a new address; or treat the mail piece as waste. Once sorted, the UAA mail pieces may then be processed differently depending on their grouping. For example, if the mail piece is returned to the sender, the mail piece could be mailed to the return address for the sender. In some example embodiments, the return address may be retrieved based on the sender identification that is decoded from the encoded value. The operations of the method 300 are complete.

At block 316, the sort module 104 sorts the mail piece as a non-UAA mail piece. The sort module 104 may perform this sort using the delivery point, which may or may not be derived from the encoded value. The operations of the method 300 are complete.

Figure 4:
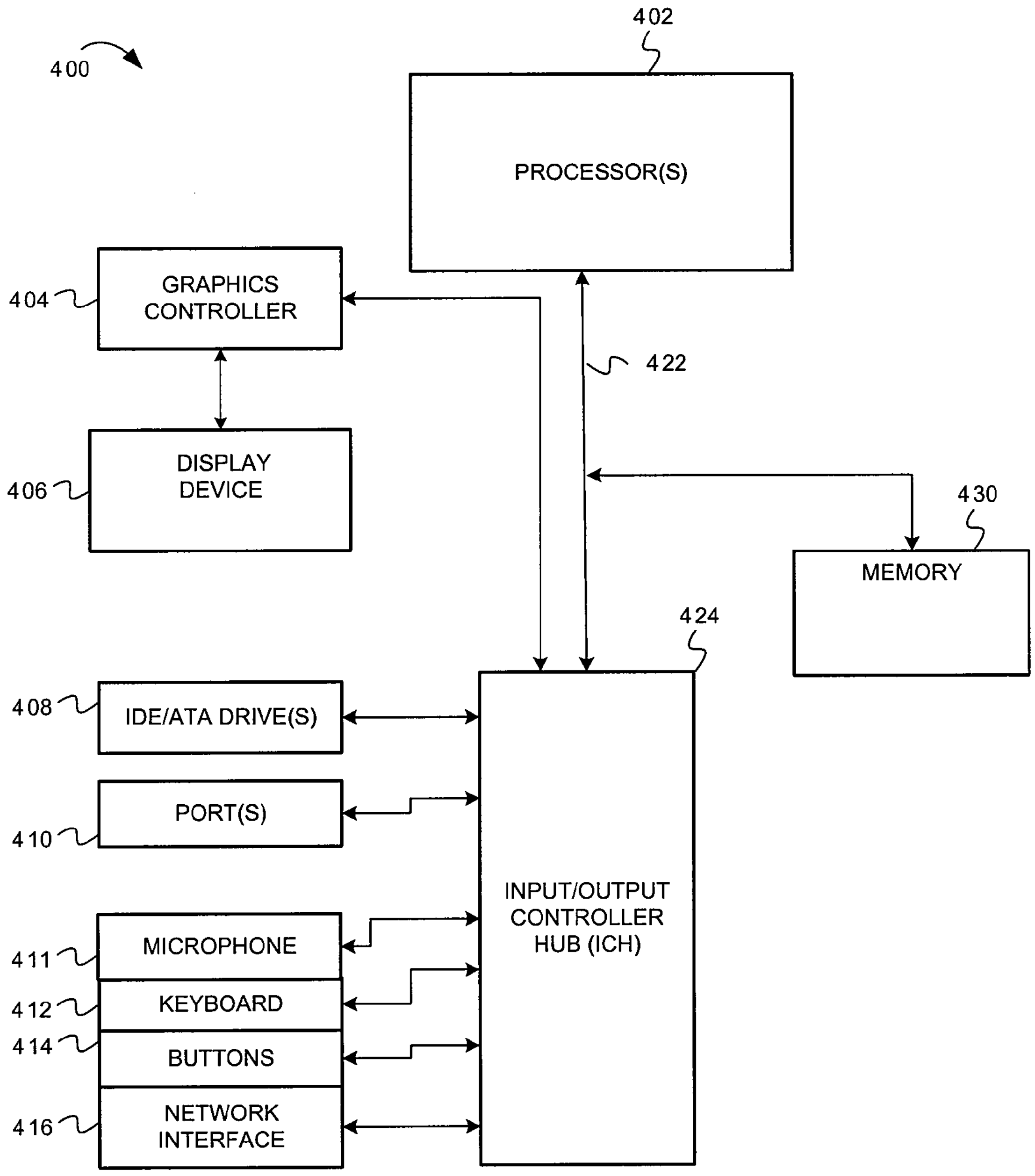
FIG. 4 illustrates a computer that may be used for processing UAA mail pieces, according to some example embodiments.

A detailed block diagram of an example computer environment, according to some embodiments, is now described. In particular, FIG. 4 illustrates a computer that may be used for processing of UAA mail pieces, according to some example embodiments. In some example embodiments, the computer system 400 may be representative of parts of the mail sorter 102, the sort module 104 or the UAA module 106.

As illustrated in FIG. 4, the computer system 400 comprises processor(s) 402. The computer system 400 also includes a memory unit 430, processor bus 422, and Input/Output controller hub (ICH) 424. The processor(s) 402, memory unit 430, and ICH 424 are coupled to the processor bus 422. The processor(s) 402 may comprise any suitable processor architecture. The computer system 400 may comprise one, two, three, or more processors, any of which may execute a set of instructions in accordance with embodiments of the invention.

The memory unit 430 may store data and/or instructions, and may comprise any suitable memory, such as a dynamic random access memory (DRAM). The computer system 400 also includes IDE drive(s) 408 and/or other suitable storage devices. A graphics controller 404 controls the display of information on a display device 406, according to some embodiments of the invention.

The input/output controller hub (ICH) 424 provides an interface to I/O devices or peripheral components for the computer system 400. The ICH 424 may comprise any suitable interface controller to provide for any suitable communication link to the processor(s) 402, memory unit 430 and/or to any suitable device or component in communication with the ICH 424. For one embodiment of the invention, the ICH 424 provides suitable arbitration and buffering for each interface.

For some embodiments of the invention, the ICH 424 provides an interface to one or more suitable integrated drive electronics (IDE) drives 408, such as a hard disk drive (HDD) or compact disc read only memory (CD ROM) drive, or to suitable universal serial bus (USB) devices through one or more USB ports 410. For one embodiment, the ICH 424 also provides an interface to a keyboard 412, a mouse 414, a CD-ROM drive 418, one or more suitable devices through one or more Firewire ports 416. For one embodiment of the invention, the ICH 424 also provides a network interface 420 though which the computer system 400 can communicate with other computers and/or devices.

In some embodiments, the computer system 400 includes a machine-readable medium that stores a set of instructions (e.g., software) embodying any one, or all, of the methodologies for described herein. Furthermore, software may reside, completely or at least partially, within memory unit 430 and/or within the processor(s) 402.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In example embodiments, a machine-readable medium includes volatile and/or non-volatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components.

Embodiments of the invention include software, data processing hardware, data processing system-implemented methods, and various processing operations, further described herein.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A computerized method comprising:

sorting mail, wherein sorting mail for a mail piece comprises:

reading an encoded value located on the mail piece;

decoding the encoded value to determine an identification of a class of the mail piece and an identification of a service type of the mail piece;

determining that the mail piece is an actual undeliverable as addressed mail piece, wherein the actual undeliverable as addressed mail piece comprises a mail piece that cannot be delivered as addressed, wherein in response to the mail piece being determined to be the actual undeliverable as addressed mail piece, the mail piece is either forwarded to the addressee of the mail piece, returned to the sender of the mail piece, or treated as waste; and performing the following operation in response to determining that the mail piece is the actual undeliverable as addressed mail piece:

determining a final disposition of the mail piece using at least one of the identification of the class of the mail piece or the identification of the service type of the mail piece derived from the encoded value, wherein the class of the mail piece comprises a level of service for the mail piece that is based on at least one of a feature of the mail piece, a service level of the mail piece, a postage price of the mail piece, and a presort requirement of the mail piece, and wherein the service type of the mail piece that define instructions for how to process the mail piece in response to the mail piece being an actual undeliverable as addressed mail piece.

2. The computerized method of claim 1, wherein decoding the encoded value comprising decoding the encoded value to determine an identification of a recipient of the mail piece, wherein performing the following operation comprises:

retrieving a name of the recipient of the mail piece using the identification of the recipient of the mail piece from the encoded value; and confirming that the mail piece is an actual undeliverable as addressed mail piece, using the name of the recipient of the mail piece.

3. The computerized method of claim 2, wherein decoding the encoded value comprising decoding the encoded value to determine an identification of a delivery point for the mail piece and an identification of a recipient of the mail piece, wherein determining that the mail piece is an undeliverable as addressed comprises determining whether the mail piece is undeliverable as addressed using the identification of the delivery point for the mail piece and the identification of the recipient of the mail piece from the encoded value.

4. The computerized method of claim 3, wherein retrieving the name of the recipient of the mail piece comprises performing a lookup into a database of names of recipients of the mail pieces using the identification and return address of the sender of the mail piece and the identification of the recipient of the mail piece.

5. The computerized method of claim 4, wherein the database is stored in a machine-readable medium that is remote relative to where operations of the computerized method occur.

6. The computerized method of claim 5, wherein the machine-readable medium is under the control of the sender of the mail piece.

7. The computerized method of claim 4, wherein the names of the recipients stored in the database are encrypted, wherein retrieving the name of the recipient of the mail piece comprises decrypting the name of the recipient of the mail piece prior to confirming that the mail piece is an actual undeliverable as addressed mail piece.

8. The computerized method of claim 1, wherein the final disposition of the mail piece that is undeliverable as addressed comprises at least one returning the mail piece to a sender of the mail piece, forwarding the mail piece to a different address, and treating the mail piece as waste.

9. The computerized method of claim 1 further comprising performing the following operation in response to determining that the mail piece is an actual undeliverable as addressed mail piece:

transmitting, to a mailer of the mail piece, at least one of the encoded value of the mail piece, a destination address for the mail piece, a name of a recipient for the mail piece, a delivery point bar code for the mail piece, a final disposition of the mail piece, a new destination address for the mail piece or a new destination delivery point bar code.

10. The computerized method of claim 1, wherein sorting the mail comprising sorting mail for a number of mail pieces, the computerized method further comprising sorting the number of mail pieces;

storing, for the number of mail pieces that are sorted and by identification of mailers of the number of mail pieces, in a machine-readable medium, data for the number of mail pieces that includes the encoded value, the identification of the class of mail piece and the identification of the service type of the mail piece, wherein the data for the number of mail pieces is accessible from the machine-readable medium using the encoded value, wherein the data stored in the machine-readable medium is accessible by a mail sorter at a mail sorting facility; and updating, by mailers of the number of mail pieces, of the data for the number of mail pieces stored in the machine-readable medium.

11. The computerized method of claim 10, further comprising:

retrieving the data for mail piece from the machine-readable medium;

performing final disposition of the mail piece using the data for the mail piece retrieved from the machine-readable medium; and sorting the mail piece based on the final disposition of the mail piece.

12. The computerized method of claim 1, further comprising performing the following operation in response to determining that the mail piece is a candidate undeliverable as addressed mail piece:

attaching, to an image of the mail piece, the identification of the class of the mail piece and the identification of the service type of the mail piece that are derived from decoding of the encoded value, in response to a determination that the mail piece can not be confirmed as an actual undeliverable as addressed mail piece.

13. The computerized method of claim 1, further comprising performing the following operation in response to determining that the mail piece is undeliverable as addressed:

attaching, to an image of the mail piece, the identification of the class of the mail piece and the identification of the service type of the mail piece that are derived from decoding of the encoded value, in response to a determination that final disposition cannot be performed on the mail piece.

14. The computerized method of claim 1, wherein the sorting of the mail comprises sorting mail, by a mail delivery service provider as part of delivery of the mail as part of final disposition of the mail.

15. The computerized method of claim 1, wherein the final disposition of the mail piece that is undeliverable as addressed comprises forwarding the mail piece to a different address and not returning to the sender.

16. The computerized method of claim 1, wherein the final disposition of the mail piece that is undeliverable as addressed comprises treating the mail piece as waste and not returning to the sender.

17. The computerized method of claim 1, wherein determining the final disposition of the mail piece comprises determining the final disposition using the identification of the class of the mail piece and the identification of the service type of the mail piece derived from the encoded value.

* * * * *